No. 896,801. PATENTED AUG. 25, 1908.
J. M. CONWAY.
GAS MAKING APPARATUS.
APPLICATION FILED MAR. 26, 1906.
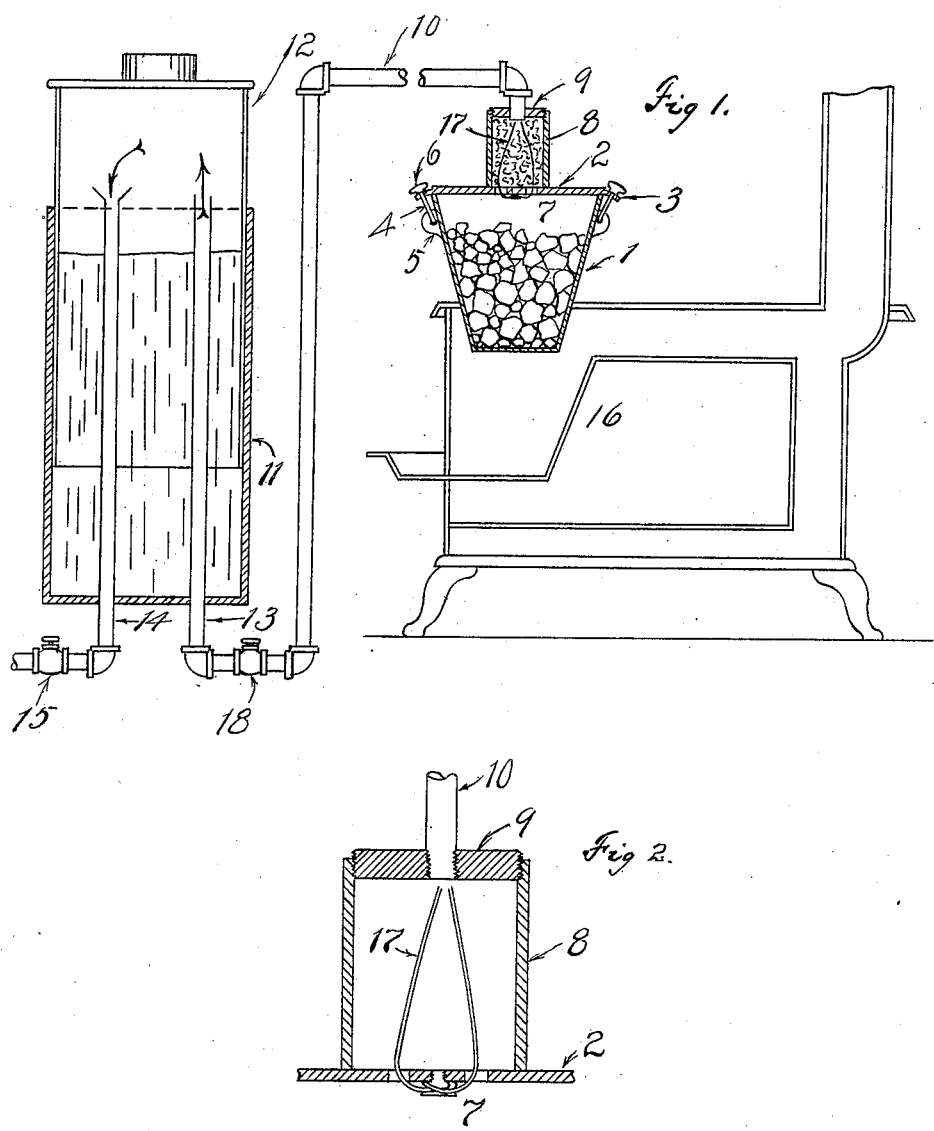
Witnesses
Lloyd Johnson
Nonnie Welch
Inventor
James M. Conway
By Robt. D. Johnston Jr.
Attorney

UNITED STATES PATENT OFFICE.

JAMES M. CONWAY, OF WOODLAWN, ALABAMA, ASSIGNOR OF ONE-THIRD TO D. M. DRENNEN AND ONE-THIRD TO W. MELVILLE DRENNEN, OF BIRMINGHAM, ALABAMA.

GAS-MAKING APPARATUS.

No. 896,801.      Specification of Letters Patent.      Patented Aug. 25, 1908.

Application filed March 26, 1906. Serial No. 308,054.

*To all whom it may concern:*

Be it known that I, JAMES M. CONWAY, a citizen of the United States, residing at Woodlawn, in the county of Jefferson and State of Alabama, have invented new and useful Improvements in Gas-Making Apparatus, of which the following is a specification.

My invention relates to an improvement in the manufacture of gas and is particularly adapted for use where it is desired to provide a small gas generating apparatus for each house.

The object of my invention is to provide an improved apparatus which can be operated by inexperienced persons and is adapted for use with furnaces or ordinary stoves so that the gas may be produced at any time desired, and after the proper quantity has been generated, the apparatus may be removed and placed out of the way.

It is a further purpose of my invention to use such an apparatus to generate gas by the decomposition or distillation of soft coal and lime in a closed receptacle subjected to heat and which is provided with an outlet chamber charged with charcoal and sulfid or analogous purifying and deodorizing materials through which the gas is caused to flow from the generator to the reservoir.

My invention further comprises the details of construction and arrangement of parts hereinafter described and illustrated in the accompanying drawings, in which:—

Figure 1, is a sectional view of the generator and reservoir. Fig. 2, is a detail enlarged view in section of the top of the generator showing the outlet chamber with the guide wires.

Similar reference numerals refer to similar parts throughout the drawings.

My apparatus in its preferred form comprises a generator 1 in the form of a cylindrical tapering vessel provided with a top 2 having oppositely disposed lugs 3 between which screw bolts 4, pivoted to lugs 5 of the vessel 1, are adapted to swing, each being provided with a thumb screw 6 by means of which the top may be forced down so as to form a substantially air tight closure for the vessel. The top is provided at or near its center with a pair of ports 7, which open into an outlet chamber 8 preferably cast integral with the top and threaded at its outer end to receive a closure 9. A pipe 10 leads from the closure 9 to the outer casing 11 of a telescopic reservoir 12 which is partially filled with water to form a seal. A vertically disposed pipe 13, which connects with the pipe 10, discharges the gas generated into the upper end of the reservoir. This gas is withdrawn through a pipe 14 in the reservoir and flows through a pipe 15 to the supply pipes for the house.

In operation, I charge the vessel 1 with soft or bituminous coal and slacked lime, and having screwed the top down substantially air tight, I set it in one of the holes in the top of a stove 16. The tapering character of the vessel adapts it to fit any sized stove hole. Before placing the vessel on the stove I remove the closure 9 and fill the chamber 8 with charcoal and sulfid, such as is commonly used in the purification of gas. By screwing the closure in securely, the apparatus is ready for the generation of gas. This is effected by the action of the heat in distilling the volatile matter from the coal and lime, and as the gas is thus generated it flows through the ports 7 and forces its way upwardly through the contents of the chamber 8 and passes off through the pipe 10 to the reservoir. To facilitate the passage of the gas through this chamber 8, I provide a guide wire 17 which terminates at one end near the end of pipe 10 and passes down through one port 7 and is bent in a loop and passed up through the other port 7, its other end also terminating near the opening of the pipe 10. A screw secures this wire to the underside of the top. These ends of the wire form guides for the flow of the gases and serve as a means to open up the body of purifying and deodorizing material when it presents too much resistance to the flow of the gas. I find in practice that the introduction of the lime materially expedites the volatilization of the coal. The charcoal and sulfid serve to purify the gas. The gas thus cleaned and deodorized, is stored in the reservoir, whence the house is supplied for lighting and heating purposes.

In practice, the generator will act very rapidly to distil the gases, and after a sufficient volume of gas has been stored in the reservoir, the valve 18, of the pipe 10, is closed and the generator removed from the stove, the pipe 10 being uncoupled from the reservoir if this is desired.

The gas generated may be used for any purposes desired, though it is particularly adapted for illuminating and heating purposes.

Having thus described my invention, what I claim as new and desire to secure by Letters Patent, is:—

1. In combination with a stove, a cylindrical gas retort adapted to fit in a stove hole, a chambered top for said retort through which the distilled gases flow, and which is adapted to contain gas purifying and deodorizing agents in said chamber, and a reservoir to receive the purified gas and deliver it to the service pipes.

2. The combination of a gas distilling retort, a top therefor carrying an integral chamber, clamps to fasten said top in place, ports to admit the distilled gases into said chamber, a screw closure for said chamber with which a discharge pipe is connected, wires leading from said ports to said discharge pipe to facilitate the passage of the gases through a body of material in said chamber adapted to purify and deodorize the gas, and a storage reservoir connected to said pipe.

In testimony whereof I have hereunto set my hand in presence of two subscribing witnesses.

JAMES M. CONWAY.

Witnesses:
 THOS. J. WINGFIELD,
 NOMIL WELSH.